United States Patent [19]
Li et al.

[11] Patent Number: 5,555,370
[45] Date of Patent: Sep. 10, 1996

[54] METHOD AND SYSTEM FOR CREATING COMPLEX OBJECTS FOR USE IN APPLICATION DEVELOPMENT

[75] Inventors: Shih-Gong Li; John S. Wang, both of Austin, Tex.

[73] Assignee: International Business Machines Corporation, Armonk, N.Y.

[21] Appl. No.: 174,561

[22] Filed: Dec. 28, 1993

[51] Int. Cl.⁶ ........................................................ G06F 3/14
[52] U.S. Cl. ........................................... 395/161; 395/155
[58] Field of Search ..................................... 395/155, 161, 395/159, 164, 600, 650, 700, 157, 158, 156

[56] References Cited

U.S. PATENT DOCUMENTS

| | | | |
|---|---|---|---|
| 5,062,060 | 10/1991 | Kolnick | 395/159 |
| 5,315,703 | 5/1994 | Matheny et al. | 395/164 |
| 5,335,323 | 8/1994 | Kolnick | 395/164 |
| 5,367,633 | 11/1994 | Matheny et al. | 395/164 |
| 5,388,264 | 2/1995 | Tobias, II et al. | 395/650 |

OTHER PUBLICATIONS

David B. Anderson, "Experience with Flamingo: A Distributed, Objec-oriented User Interface System", Sep. 1986, pp. 177–185.

Tomasz Imielinski, Shamim Naqvi, Kumar Vadaparty, "Incompleter Objects—A Data Model for Design and Planning Applications", 1991, pp. 288–297.

Gail E. Kaiser, "Transactions for Concurrent Object–oriented Programming Systems", pp. 136–138.

Waldemar Horwat, Andrew A. Chien and William J. Dally, "Experience with CST: Programming and Implementation", pp. 101–109.

Steve Engelstad, Keith Falck, Warren Nomtgomery, Joe Neumann, Ralph Straubs, Jim Vandenorpe, and Mike Wilde, "A Dynamic C–Based Object–Oriented system for Unix", pp. 73–85.

Rahim Yaseen, Stanley Y. W. Su and Herman Lam, "An Extensible Kernel Object Management System", 1991, pp. 247–263.

Primary Examiner—Mark R. Powell
Assistant Examiner—Ruay Lian Ho
Attorney, Agent, or Firm—Mark S. Walker; Duke W. Yee; Andrew J. Dillon

[57] ABSTRACT

A data processing system for permitting a user to efficiently create an application utilizing a plurality of objects in a graphic user interface. Objects are graphically presented to the user in the graphic user interface. The user is permitted to create a compound object utilizing at least two of the plurality of objects. The compound object is automatically associated with the objects in response to a user input, wherein the compound object thereafter may be selected by the user to efficiently create an application.

19 Claims, 13 Drawing Sheets

METHOD AND SYSTEM FOR CREATING COMPLEX OBJECTS FOR USE IN APPLICATION DEVELOPMENT

BACKGROUND OF THE INVENTION

1. Technical Field

The present invention relates to an improved method and system for developing an application and in particular to a method and system for providing complex objects for use in developing an application.

2. Description of the Related Art

Today, many programmers and application designers utilize an application builder to develop a complex application. An application builder is a program that allows a user to develop a complex application. Typically, in a graphic user interface (GUI), the application builder provides a GUI interface to the user creating an application. The user may select various objects, such as a window, text field, button, or slider, for use in the application under development. The user can "drag and drop" objects into the desired locations for the application under development.

Objects requiring actions are referred to as "source" objects and include application specific objects defined by the user and predefined system objects, such as pop-up menus, scroll bars, sliders, push buttons, and menu bars with pull-down menus for further selections. Actions on a source object may generate another object, which is the target object. A target object may become a source object that is associated with some further actions. In developing an application, a user may create a number of complex objects employing the objects provided by the application builder. Many times, each of the complex objects may only have minor variations from the other complex object created by the user. Currently, the user must create each complex object from scratch. In fact, often times, a user may recreate a complex object for different applications under development.

Therefore, it would be advantageous to have a method and system for increasing the efficiency of application building by reducing the need for the user to recreate complex objects.

SUMMARY OF THE INVENTION

It is therefore one object of the present invention to provide an improved method and system for developing an application.

It is another object of the present invention to provide a method and system for providing complex objects in use in developing an application.

The foregoing objects are achieved as is now described. A data processing system for permitting a user to efficiently create an application utilizing a plurality of objects in a graphic user interface graphically presents objects to the user in the graphic user interface. The user is permitted to create a compound object utilizing at least two of the plurality of objects. The compound object is automatically associated with the objects in response to a user input, wherein the compound object thereafter may be selected by the user to efficiently create an application.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
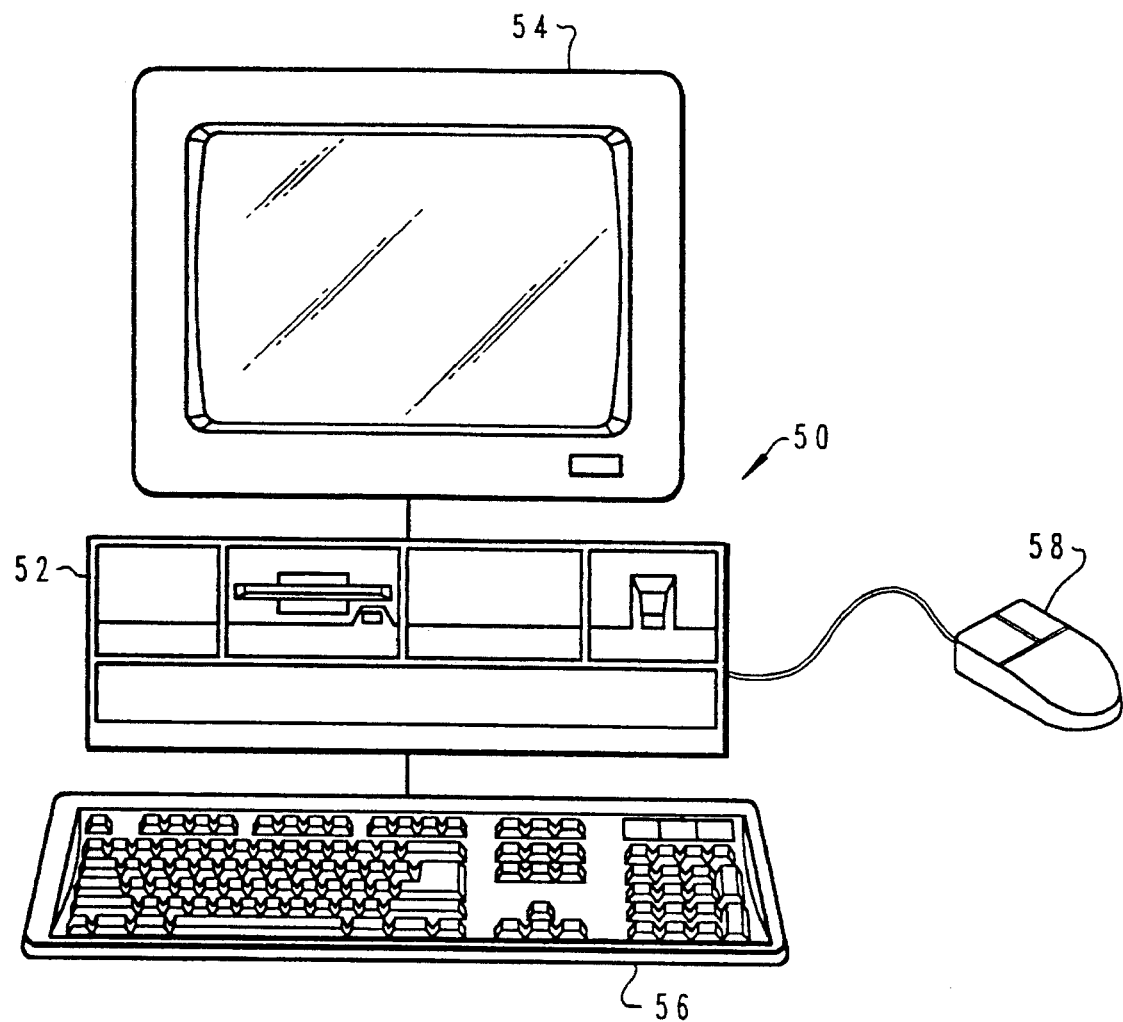
FIG. 1 depicts an illustration of a data processing system in which a preferred embodiment of the present invention may be implemented.

With reference now to the figures and in particular with reference to FIG. 1, a data processing system 10 is depicted in which a preferred embodiment of the present invention may be implemented. Data processing system 10 includes a system unit 2, a video display terminal 4, a keyboard 6, and a mouse 8. Data processing system 10 may be implemented utilizing any suitable computer, such as an IBM PS/2 or IBM RISC SYSTEM/6000 computer, both products of International Business Machines Corporation, located in Armonk, New York. "PS/2" and "RISC SYSTEM/6000" are trademarks of International Business Machines Corporation. Although, the depicted embodiment is a personal computer, a preferred embodiment of the present invention may be implemented in other types of data processing systems, such as, for example, intelligent workstations, mini computers, or local area networks.

Figure 2:
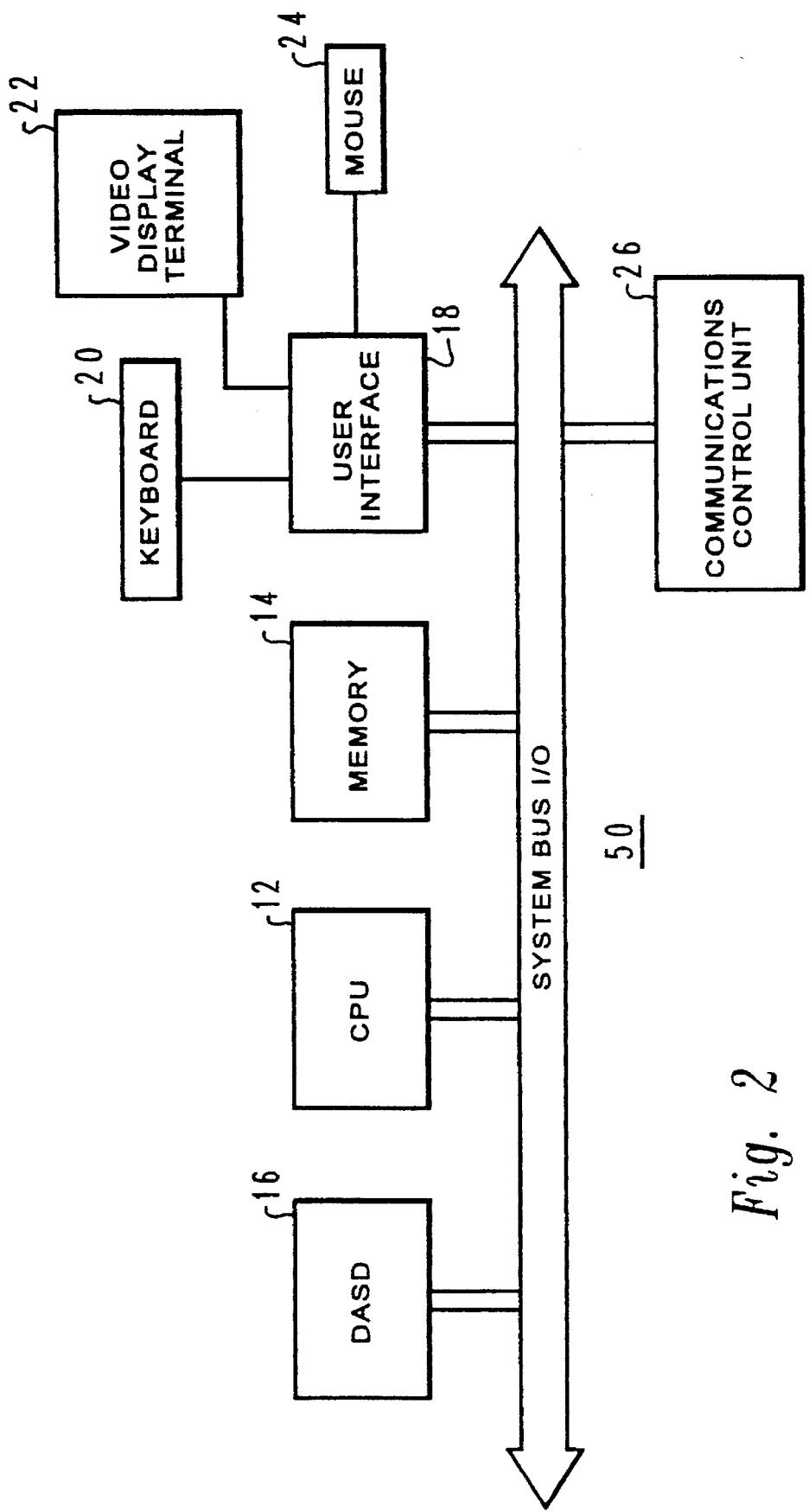
FIG. 2 is a block diagram of the data processing system depicted in FIG. 1 in accordance with a preferred embodiment of the present invention.

Referring now to FIG. 2, a block diagram of a data processing system 10 in FIG. 1 is illustrated in accordance with a preferred embodiment of the present invention. System bus 11 provides a connection between various components within data processing system 10. Central processing unit (CPU) 12 provides the decision making capability in data processing system 10. CPU 12 may include one or more processors, such as an 80486 processor or a Pentium processor available from Intel Corporation in Santa Clara, Calif. "Pentium" is a trademark of Intel Corporation.

Memory 14 provides a storage for data processing system 10 and may include both read only memory (ROM) and random access memory (RAM). Direct access storage device (DASD) 16 provides additional storage for data processing system 10. DASD 16 typically provides long term storage for data processing system 10. DASD 16 may include, for example, a hard disk drive or a floppy disk drive.

User interface 18 provides an interface between data processing system 10 and peripherals employed by user to interact with data processing system 10. User interface 18 may include various adapters and drivers for driving peripherals, such as keyboard 20, video display terminal 22, and mouse 24.

Communications unit 26 provides the interface between the data processing system 10 and some other data processing system such as another personal computer or a network.

Figure 3:
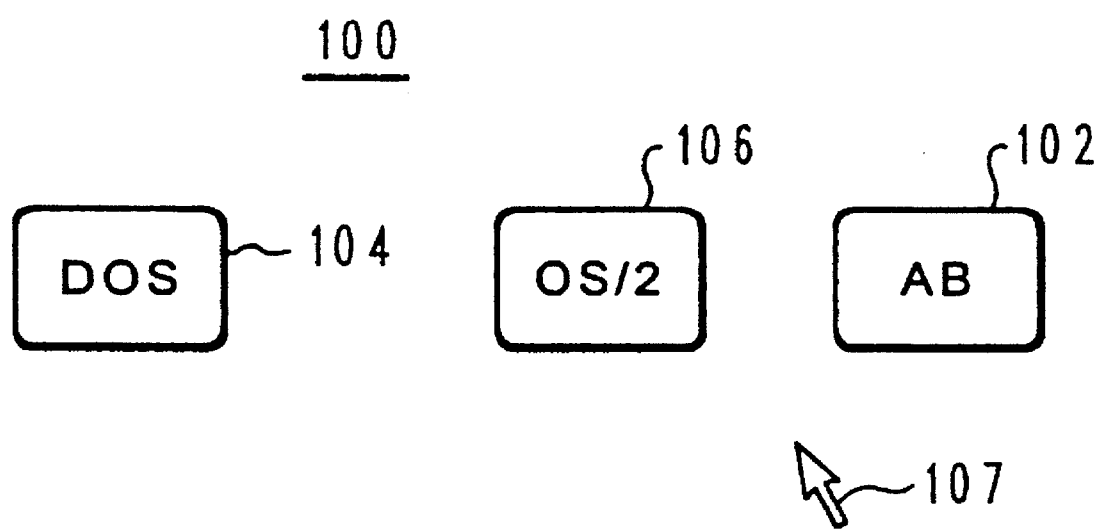
FIGS. 3-12 depict illustrations of the creation of an application using objects from a toolbox in an application builder in accordance with the preferred embodiment of the present invention.

An application builder is utilized to construct applications. Referring to FIG. 3, Desktop 100 contains Application Builder (AB) icon 102, DOS icon 104, and OS/2 icon 106. Desktop 100 may be executing on an AIX or an OS/2 operating system available from International Business Machines Corporation in accordance with a preferred embodiment of the present invention. "AIX" and "OS/2" are registered trademarks of International Business Machines Corporation. DOS icon 104 represents a DOS application in minimized form and OS/2 icon 106 represents an OS/2 application in minimized form. Application Builder icon 102 is a minimized form of an application builder program that a user, such as a program designer, may utilize to develop an application. AIC is an example of an application builder and is available from Visual Edge Software, Ltd.

Application Builder icon 102 may be selected and opened utilizing pointer 107. Pointer 107 is an iconic image controlled by a mouse or other similar device and is displayed on the video display of a data processing system to visually indicate icons, menus, or the like that may be selected or manipulated. The term "mouse" when utilized in this document refers to any type of operating system supported graphical pointing device including, but not limited to: a mouse, track ball, light pen, touch screen, and the like. A pointing device such a mouse is typically employed by a user of a data processing system to interact with the data processing system's GUI. One manipulation is a "drag and drop" operation, which typically involves moving a pointer over an object and depressing a mouse button to select the object, moving the object to the desired location, and releasing the mouse button to release or "drop" the object.

Figure 4:
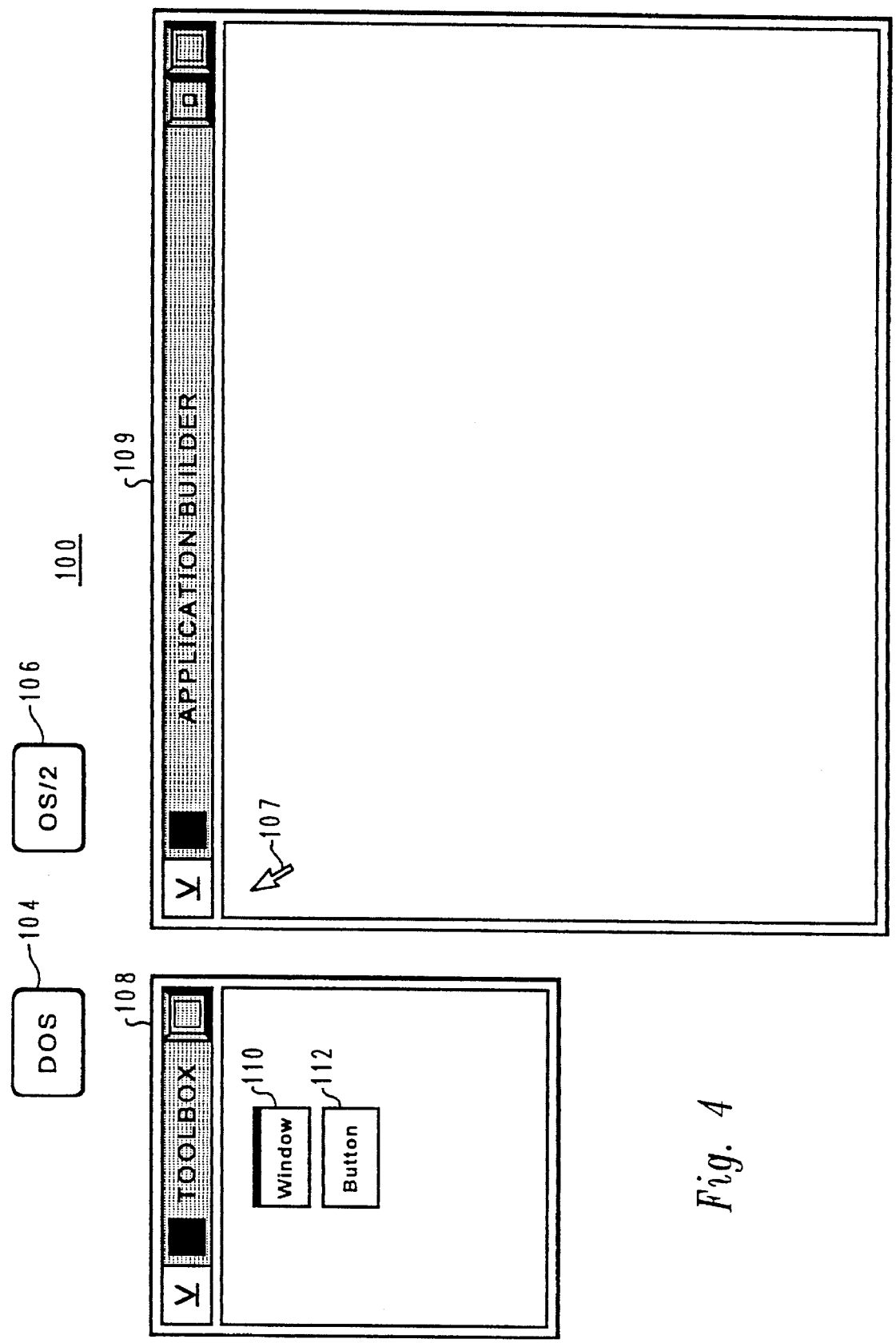
Figure 5:
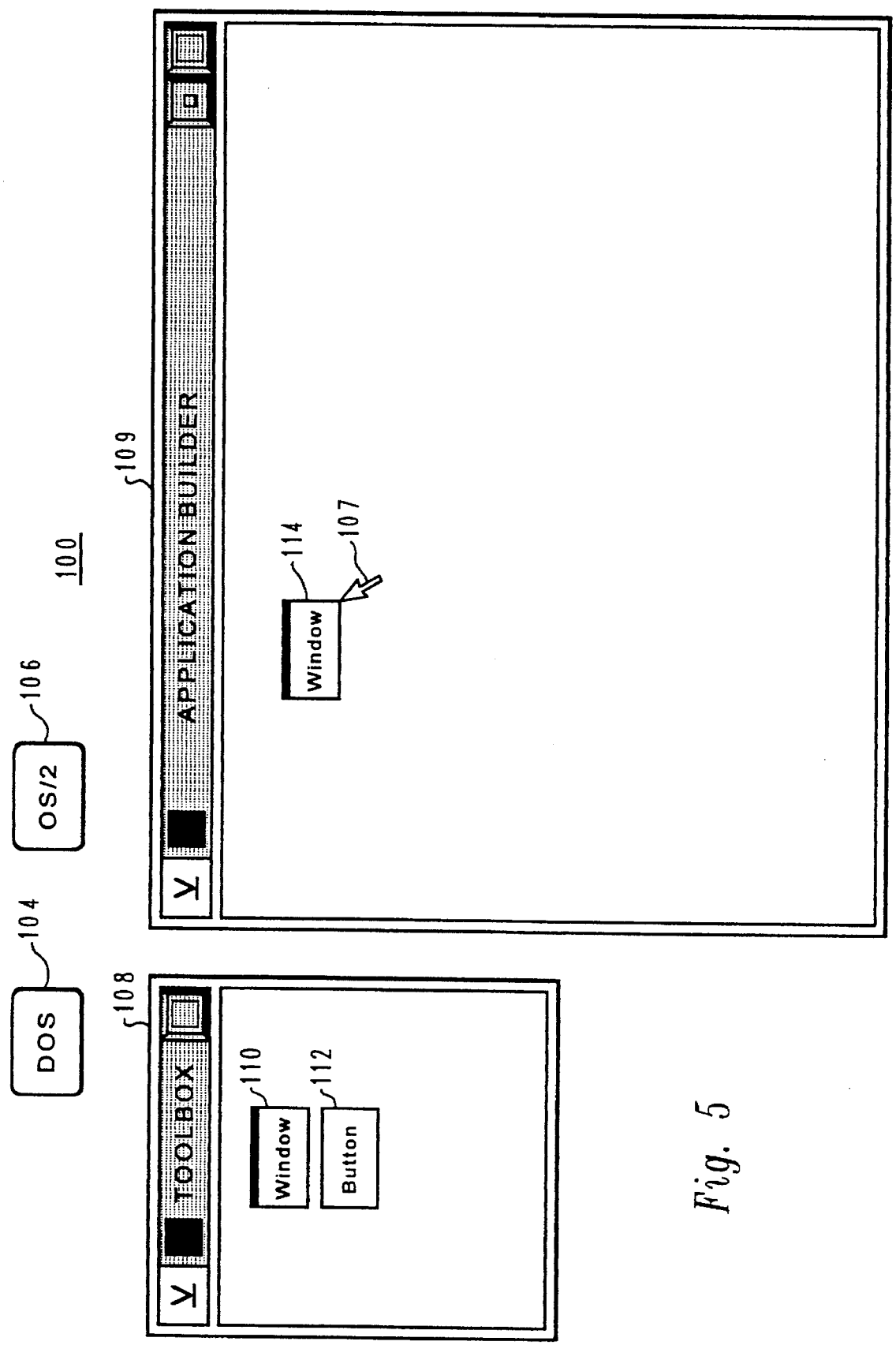

Referring next to FIG. 4, an illustration of a Toolbox window 108 and an Application Builder window 109 is depicted in accordance with the preferred embodiment of the present invention. Toolbox window 108 and Application Builder window 109 are displayed after the Application Builder icon 102 in FIG. 3 is selected and opened by double clicking a mouse button in accordance with a preferred embodiment of the present invention. Toolbox window 108 includes Window 110 and Button 112. In FIG. 5, Window 114 is created within Application Builder window 109 by a drag and drop application involving Window 110, wherein Window 110 is selected with pointer 107 and dragged to Application Builder window 109 and dropped on Application Builder window 109 causing a copy of Window 110, Window 126 to be placed within Application Builder window 109.

Figure 6:
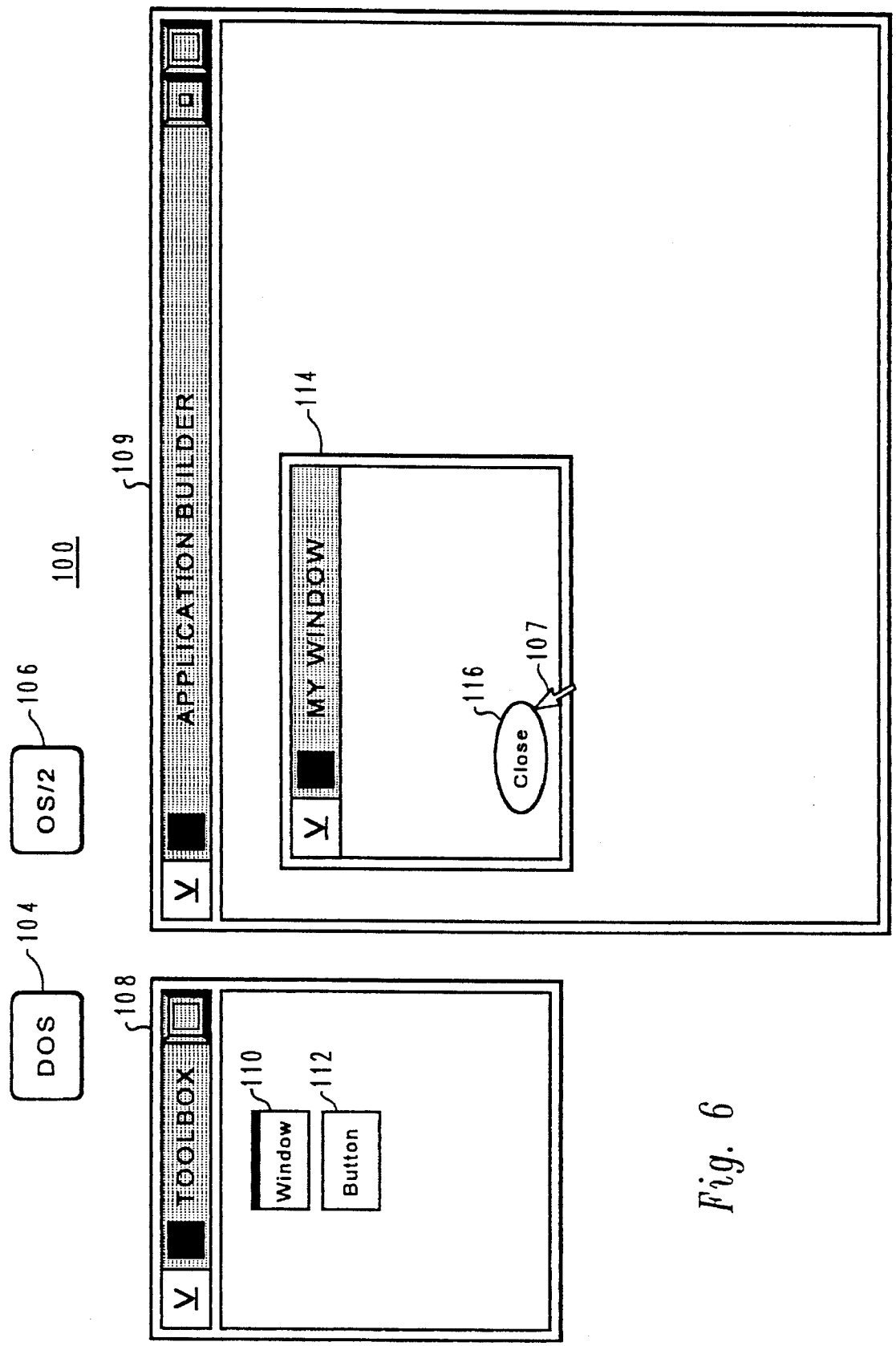
Figure 7:
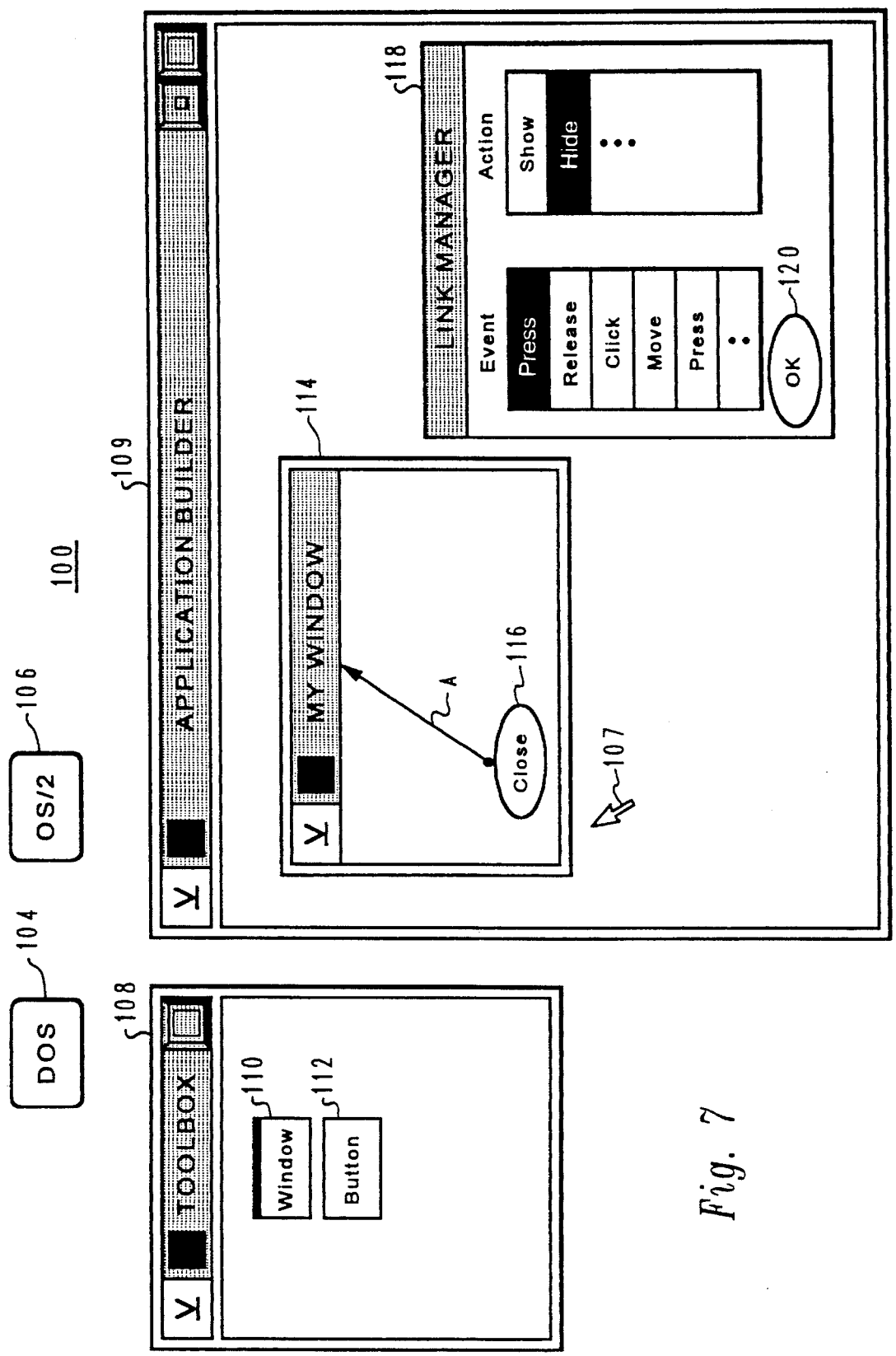

Window 114 is enlarged and entitled "My Window" in FIG. 6. In addition, a Close button 116 is created within Window 114 by dragging Button 112 from Toolbox window 108 and dropping it within Window 114. The button is then renamed Close to create Close button 116. Next, the user links Closed button 116 with Window 114, as illustrated by link A in FIG. 7. Additionally, Link Manager window 118 is displayed to the user. Link Manager window 118 includes a number of events and actions that may be selected by the user. Ok button 120 is located within Link Manager window 118 and is selected by the user when the user is satisfied with the selections made. In the depicted example, the user selects a "Press" event for Close button 116 and a "Hide" action for Window 114, as illustrated in FIG. 7.

Figure 8:
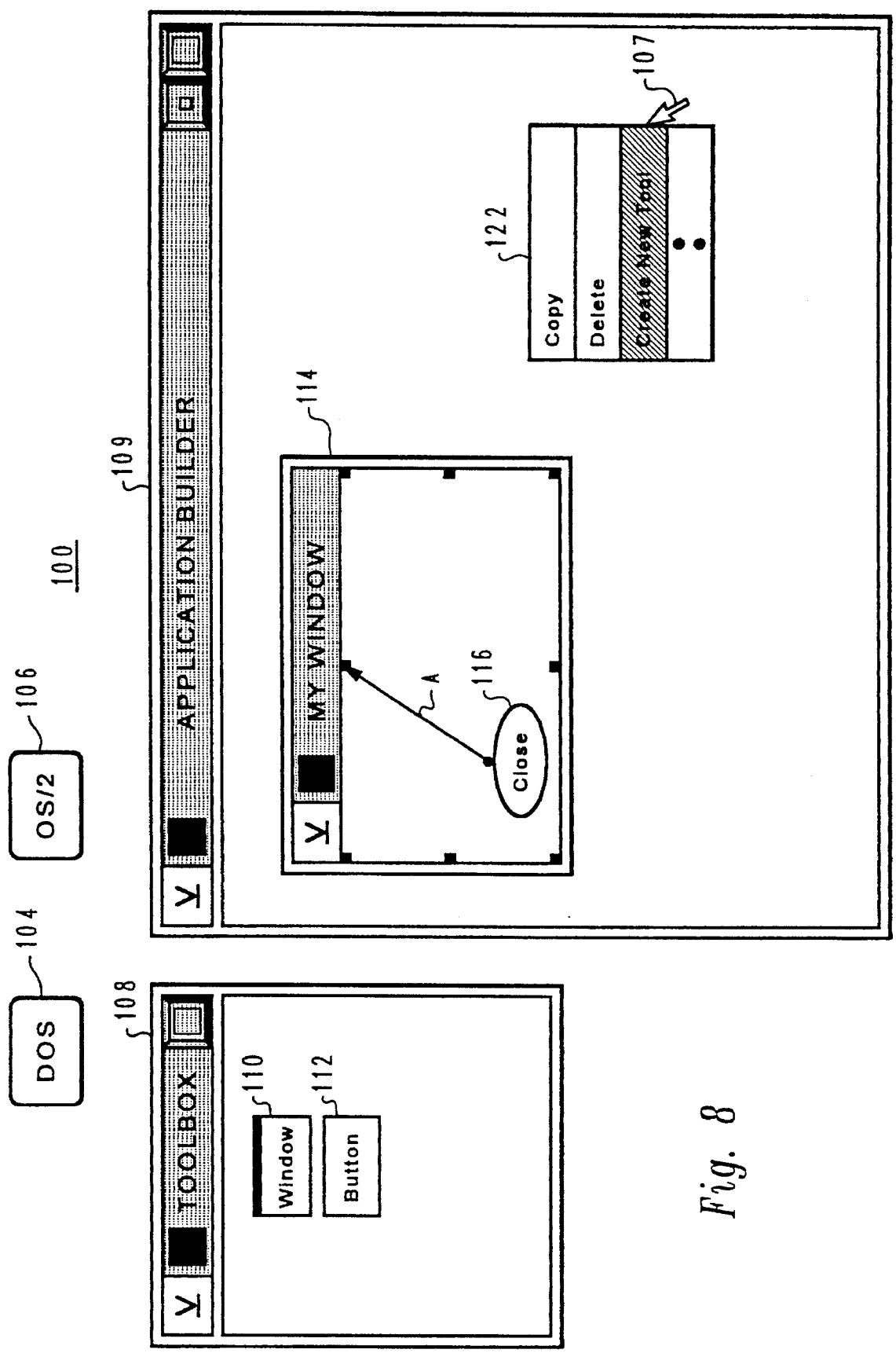
Figure 9:
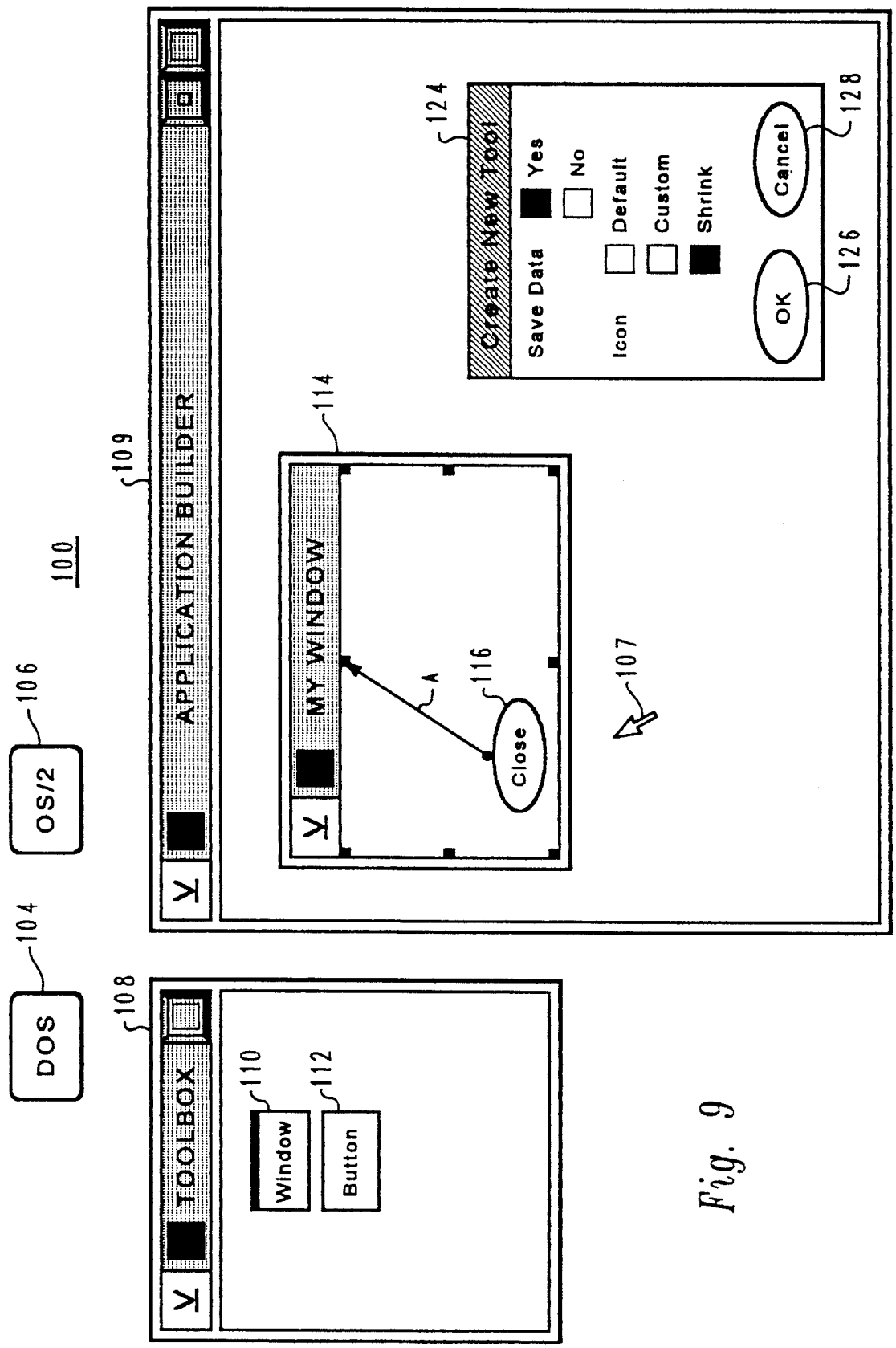

Thereafter, the user selects Window 114, which is highlighted in response to the selection, as illustrated in FIG. 8. The user then depresses a menu mouse button to display Menu 122 in FIG. 8. This menu includes a number of options for the object, Window 114. In this example, "Create New Tool" is the option selected by the user. A menu mouse button is typically a mouse button not utilized by the user for selecting objects that causes a menu to be displayed to the user when depressed. In response, Create New Tool window 124 is displayed to the user, as depicted in FIG. 9. Create New Tool window 124 includes a number of options for the user to select. The user may choose whether to save data by selecting the "yes" or "no" option within Create New Tool window 124. An icon type also may be selected by the user selecting either "Default," "Custom," or "Shrink" option. When the user is satisfied with the choices selected, pressing Okay button 126 results in the execution of selected choices. On the other hand, if the user decides not to create a new tool, Cancel button 128 may be pressed to cancel the process.

Figure 10:
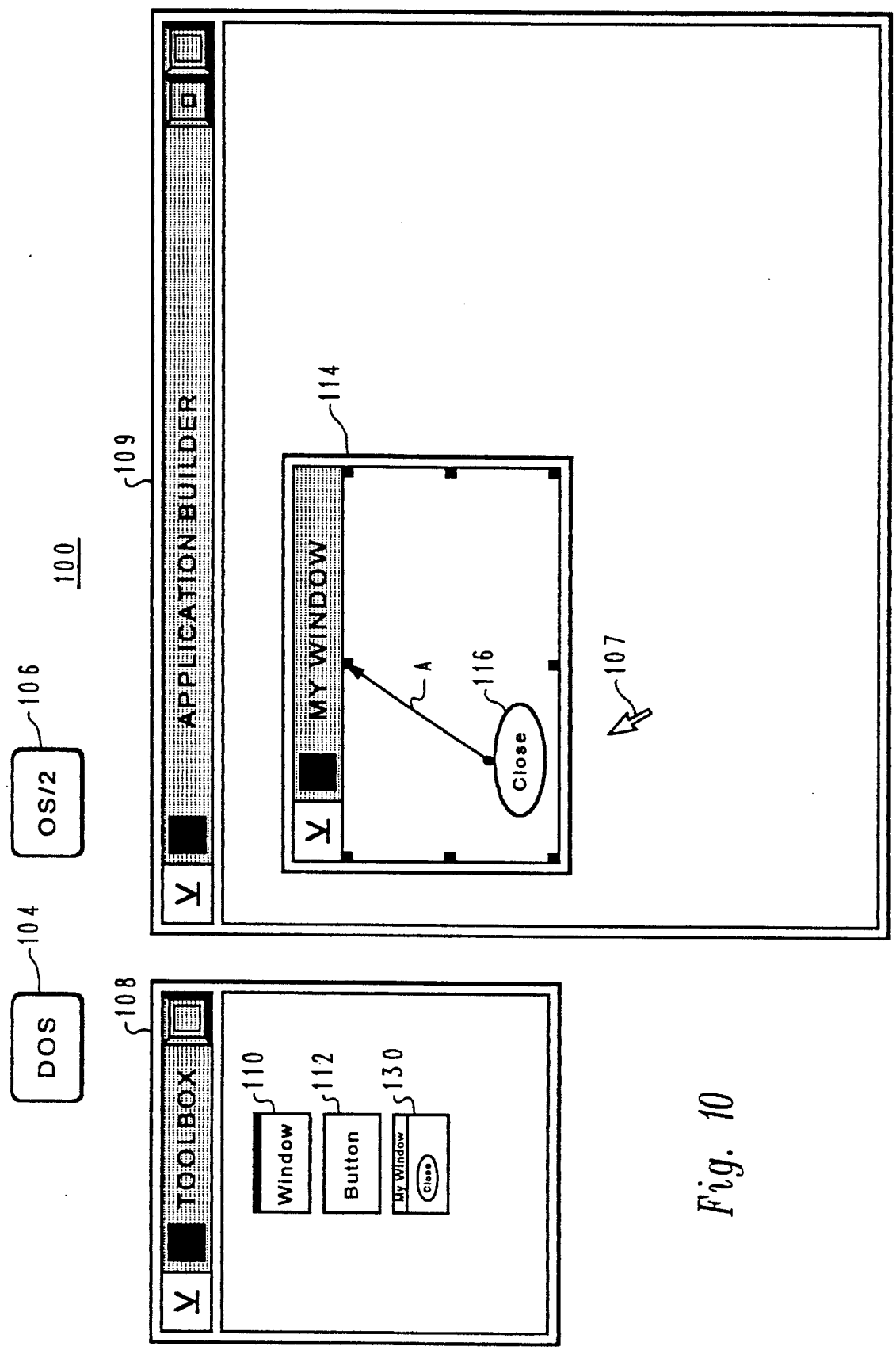
Figure 11:
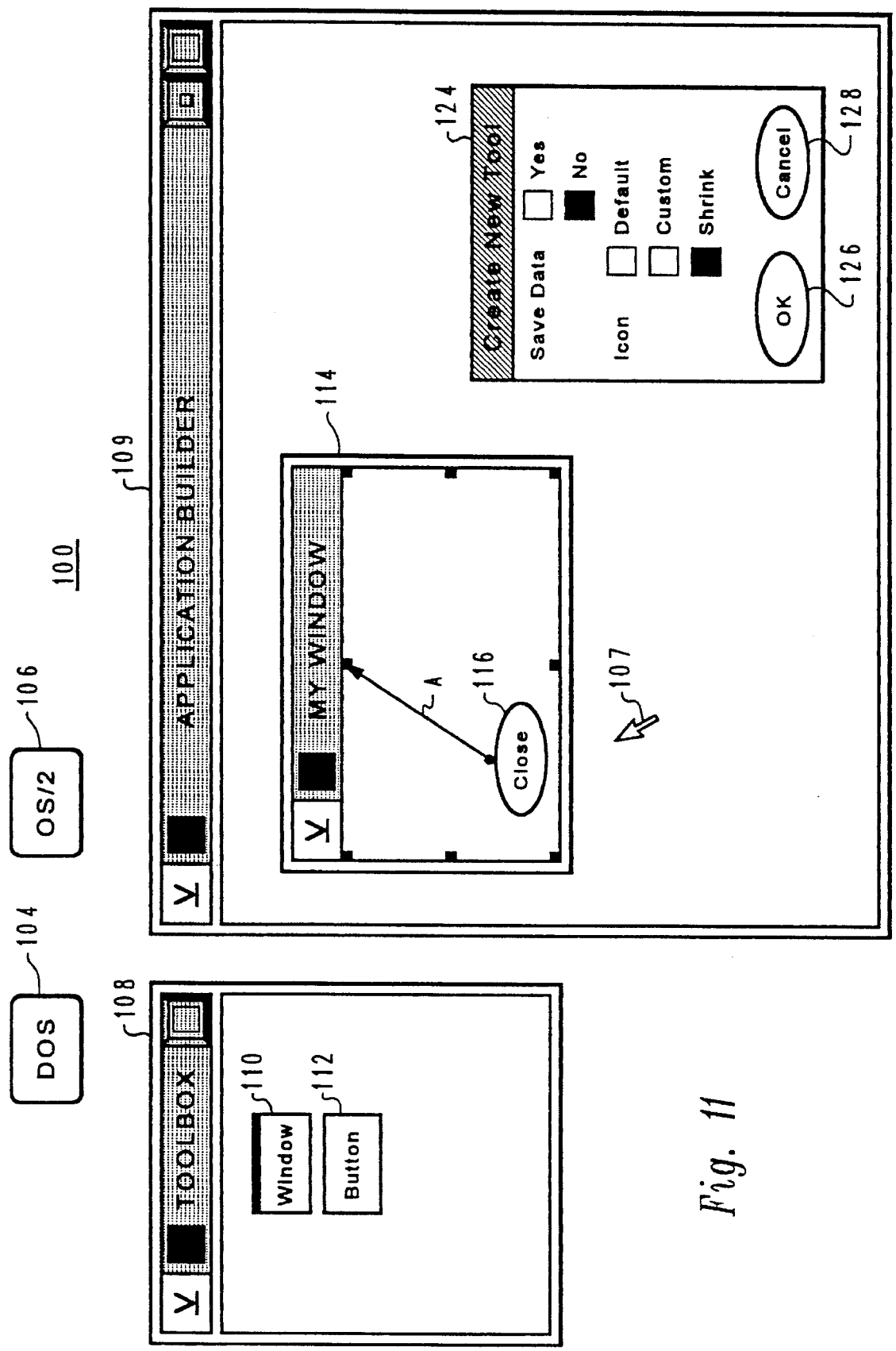
Figure 12:
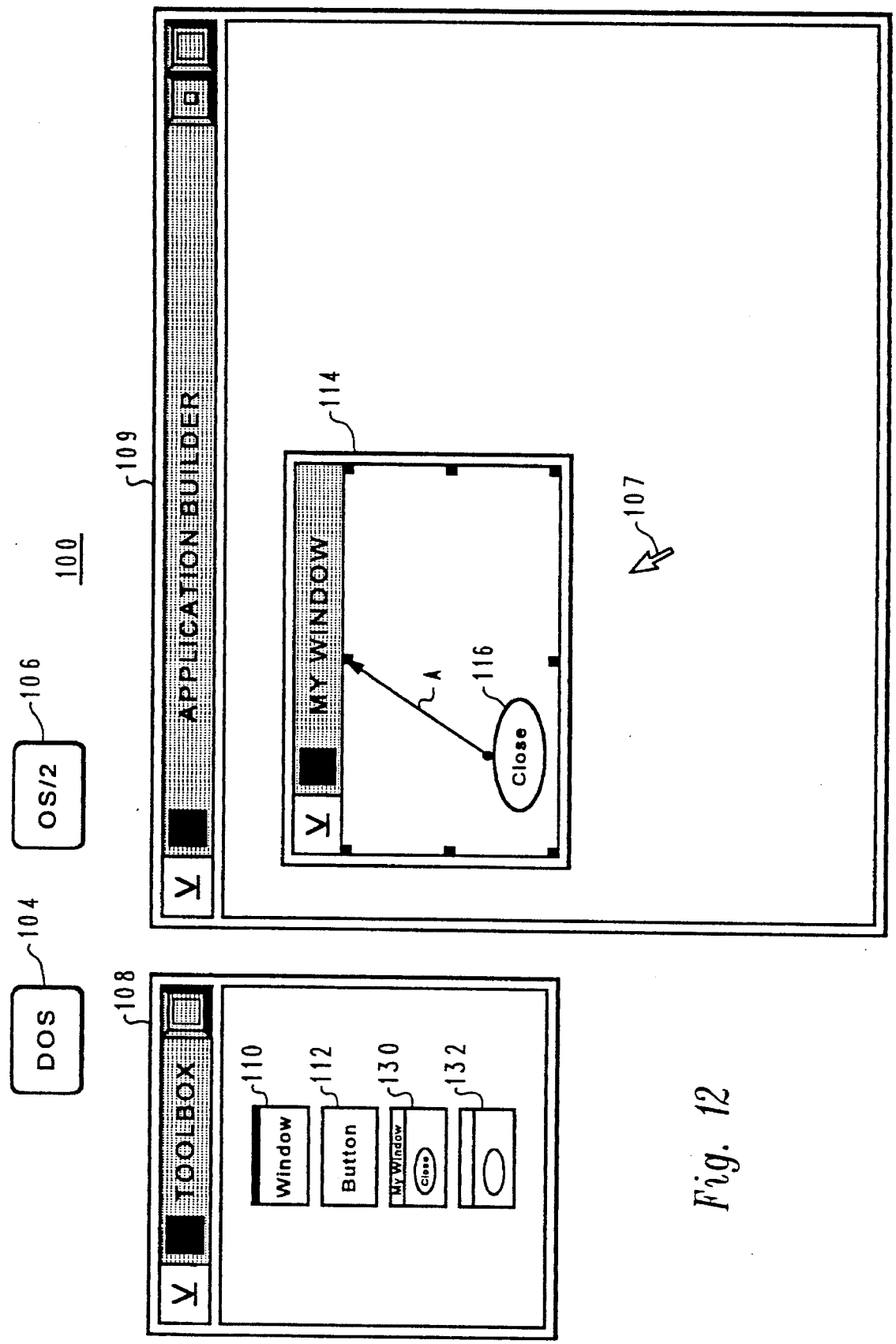

In the depicted example, the user has elected to save data and has selected a shrink icon. After pressing Okay button 126, a new icon, My Window icon 130 is created within Toolbox window 108 as illustrated in FIG. 10. Alternatively, the user may elect to not save data as depicted by the option selected for Create New Tool window 124 in FIG. 11. When the user presses Okay button 126 with the selected options as depicted in FIG. 11, an icon 132 is created within Toolbox window 108, as illustrated in FIG. 12. As can be seen, icon 132 is a small version of Window 114, but does not have the data depicted as in My Window icon 130. Both "My Window" and "Close" labels are not shown because the user elected not to save data for icon 132. If this new tool is selected for use in Application Builder window 109, no labels will be displayed to the user.

Figure 13:
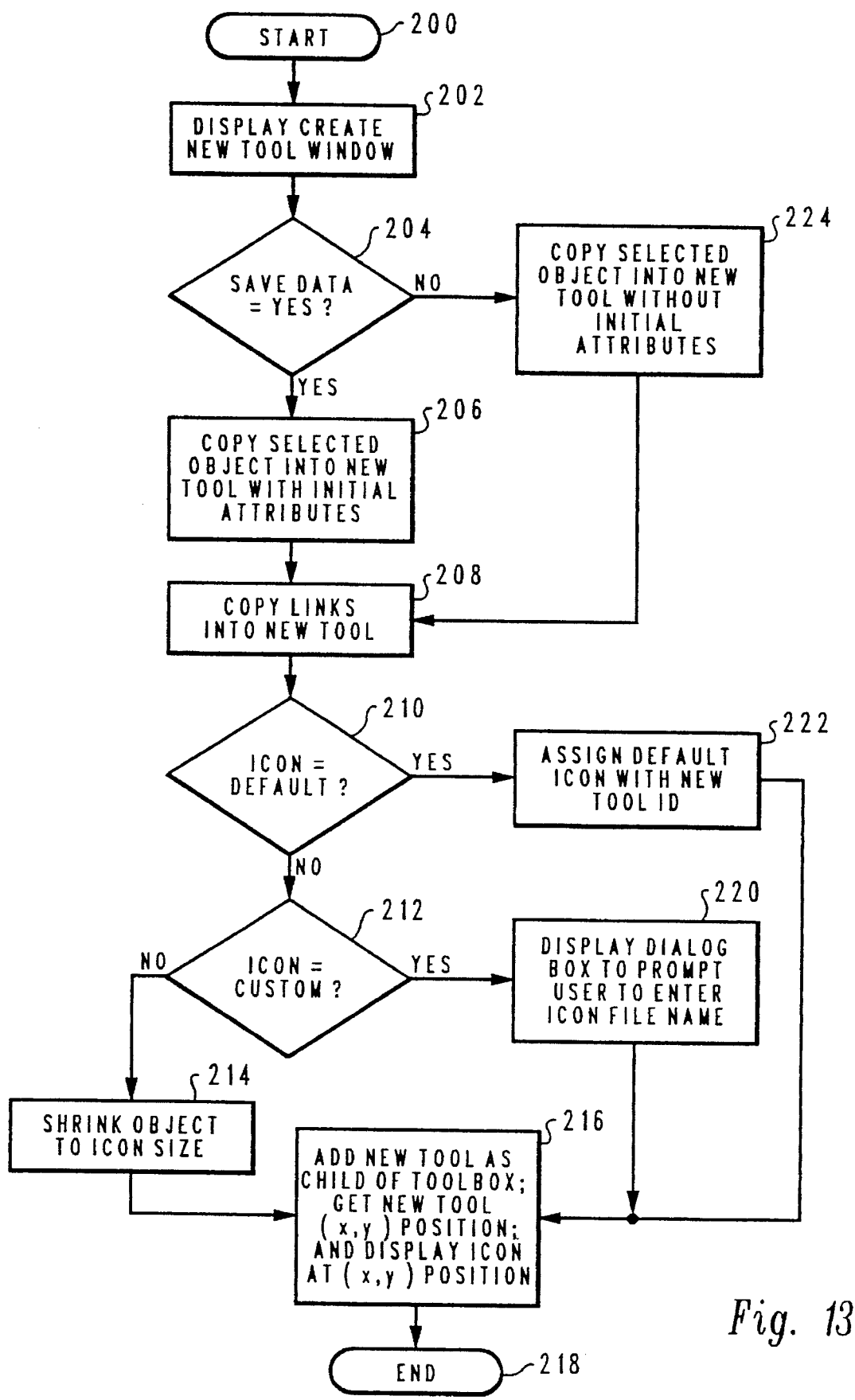
FIG. 13 is a high level flowchart of a method and system for saving complex objects for reuse by a user in accordance with the preferred embodiment of the present invention.

Referring now to FIG. 13, a high level flowchart of a method and system for saving complex objects to facilitate application development using an application builder is illustrated in accordance with a preferred embodiment of the present invention. The process begins as illustrated in Block 200. Thereafter, a Create New Tool window is displayed to the user as a pop-up menu, as depicted in Block 202. Then, a determination of whether the user has elected to save data is made, as illustrated in Block 204. If the user has elected to save data, the selected object is copied into New Tool with the initial attributes as depicted in Block 206. "New Tool" is the identification for the object being saved. Other identifiers may be used for other objects in accordance with a preferred of the present invention. Links also are copied into the New Tool, as illustrated in Block 208. The copying of links includes the events and actions associated with the links in accordance with a preferred embodiment of the present invention.

Afterward, a determination of whether a default icon has been selected is made, as depicted in Block 210. If a default icon is not selected, the process proceeds to determine whether the custom icon has been selected, as illustrated in Block 212. If the answer to this determination is no, the object is shrunk into icon size, as depicted in Block 214. Thereafter, the new tool is added as a child of Toolbox window in a parent/child relationship in which the Toolbox window is the parent for new tool. A new tool (X,Y) position is obtained and an icon is displayed at the (X,Y) position, as illustrated in Block 216. Thereafter, the process terminates as depicted in Block 218.

Referring again to Block 212, if a custom icon is selected, a dialog box is displayed to the user, prompting the user to enter an icon file name for the custom icon, as depicted in Block 220. Referring back to Block 220, if the default icon option is selected, a default icon is associated with the new tool identification, as illustrated in Block 222. Referring back to Block 204, if the user decides not to save data, the selected object is copied into the new tool without initial attributes, as depicted in Block 224. By electing not to save data, visual information, such as the labels and any changes in color are not saved.

```
METHOD CREATE_NEW_TOOL
    DISPLAY CREATE NEW TOOL WINDOW
    IF (YES IS SELECTED FOR SAVE DATA)
        COPY THE SELECTED OBJECT INTO THE NEW
            TOOL WITH INITIAL ATTRIBUTES
    THEN
        COPY THE SELECTED OBJECT INTO THE NEW
            TOOL WITHOUT INITIAL ATTRIBUTES
    ENDIF
    COPY ALL THE LINKS INTO NEW TOOL
    IF (DEFAULT IS SELECTED FOR ICON) THEN
        ASSIGN DEFAULT ICON WITH NEW TOOL ID
    ELSE IF (CUSTOM IS SELECTED FOR ICON) THEN
        DISPLAY DIALOG BOX TO PROMPT USER FOR
            THE ICON FILE NAME
    ELSE
        SHRINK CURRENT OBJECT TO ICON SIZE
    ENDIF
    ADD NEW TOOL AS THE CHILD OF THE TOOLBOX
    DISPLAY ICON AT ((X, Y) POSITION
ENDMETHOD
```

The process depicted in FIG. 13 and in the pseudo-code are implemented in an object-oriented environment in accordance with a preferred embodiment of the present invention. Those of ordinary skill in the art, however, will realize that the present invention may be implemented in other operating system environments.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for permitting a user to efficiently create an application utilizing a plurality of objects in a graphic user interface, said method comprising:

graphically presenting a plurality of objects to said user in said graphic user interface;

permitting said user to create a compound object utilizing at least two of said plurality of objects; and automatically associating said compound object with said plurality of objects in response to a user input; and displaying an icon associated with said compound object, wherein said compound object thereafter may be graphically selected by said user to efficiently create an application.

2. The method of claim 1, wherein said plurality of objects are stored as subclasses under a root class and wherein said step of associating includes creating a new subclass for said compound object, wherein said new subclass is under said root class.

3. The method of claim 2, wherein said presenting, permitting and automatically associating steps are performed in an object-oriented environment.

4. The method of claim 1, wherein said step of graphically presenting said plurality of objects includes displaying said plurality of objects within a window.

5. The method of claim 4, wherein said step of displaying said plurality of objects includes displaying a plurality of icons associated with said plurality of objects within said window.

6. A data processing system for permitting a user to efficiently create an application utilizing a plurality of objects in a graphic user interface, said data processing system comprising:

presentation means for graphically presenting a plurality of objects to said user;

means for permitting said user to create a compound object utilizing at least two of said plurality of objects; and association means for automatically storing said compound object in association with said plurality of objects in response to a user input; and display means for displaying an icon associated with compound object, wherein said compound object thereafter may be graphically selected by said user to efficiently create an application.

7. The data processing system of claim 6, wherein said plurality of objects are stored as subclasses under a root class and wherein said association means includes means for creating a new subclass for said compound object, wherein said new subclass is under said root class.

8. The data processing system of claim 7, wherein said compound object includes links and labels and wherein only said links are stored in association with said plurality of objects.

9. The data processing system of claim 7 wherein said compound object includes links and labels and wherein said links and labels are stored in association with said plurality of objects.

10. The data processing system of claim 6, wherein said plurality of objects are presented within a tool box window.

11. The data processing system of claim 6, wherein said graphic user interface is in an object-oriented environment.

12. Data processing system of claim 6, wherein said presentation means includes display means for displaying said plurality of objects within a window.

13. The data processing system of claim 12, wherein said display means includes means for displaying a plurality of icons associated with said plurality of objects within said window.

14. A computer program product for permitting a user to efficiently create an application utilizing a plurality of objects in a graphic user interface, said computer program product comprising:

a storage device for storing instructions for use with a data processing system, wherein the storage device includes:

instructions for graphically presenting a plurality of objects to said user on a display in a data processing system;

instructions for permitting said user to create a compound object utilizing at least two of said plurality of objects;

instructions for automatically associating said compound object with said plurality of objects in said data processing system in response to a user input; and instructions for displaying said compound object, wherein said compound object thereafter may be graphically selected by said user to efficiently create an application.

15. A data processing system comprising:

a display;

a processor;

first processor means for graphically presenting a plurality of objects to said user on said display;

second processor means for permitting said user to create a compound object utilizing at least two of said plurality of objects; and third processor means for automatically storing said compound object with said plurality of objects in response to a user input; and fourth processor means for displaying said compound object, wherein said compound object thereafter may be graphically selected by said user to efficiently create an application.

16. The data processing system of claim 15, wherein said first processor means, said second processor means, and said third processor means are object-oriented processor means.

17. The data processing system of claim 15, wherein said first processor means includes display means for displaying said plurality of objects within a window on said display.

18. The data processing system of claim 15, wherein said third processor means includes means for storing said compound object in association with said plurality of objects.

19. The data processing system of claim 18, wherein said compound object includes labels and links and wherein only said labels are stored.

\* \* \* \* \*

UNITED STATES PATENT AND TRADEMARK OFFICE
CERTIFICATE OF CORRECTION

PATENT NO. : 5,555,370
DATED : September 10, 1996
INVENTOR(S) : Li et al.

It is certified that error appears in the above-indentified patent and that said Letters Patent is hereby corrected as shown below:

Column 5, line 4: insert --The following is pseudo-code for the flowchart depicted in Figure 13:--

Signed and Sealed this

Third Day of December, 1996

Attest:

BRUCE LEHMAN

Attesting Officer

Commissioner of Patents and Trademarks